United States Patent Office 2,755,911
Patented July 24, 1956

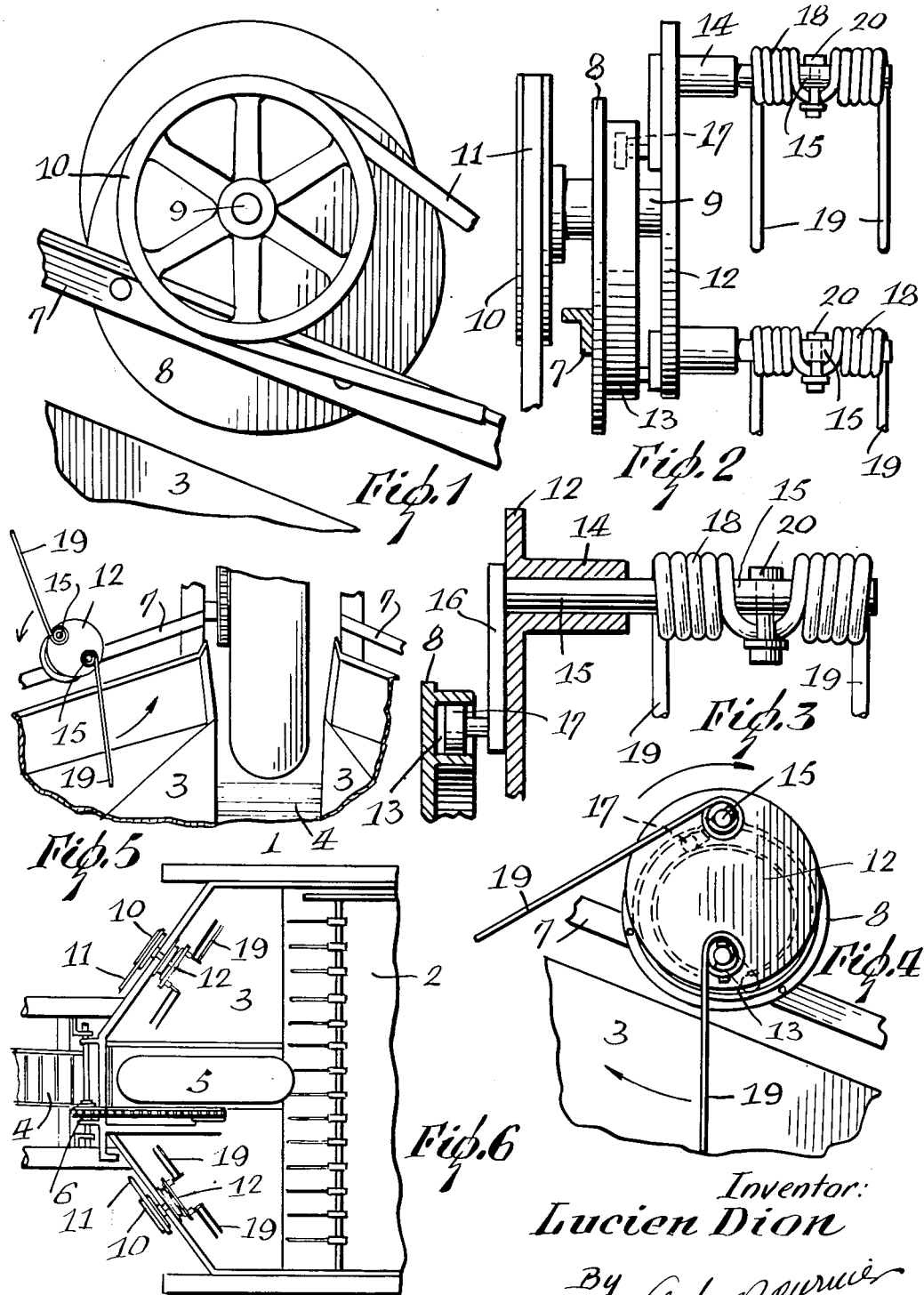

2,755,911

FEEDING DEVICE FOR AGRICULTURAL MACHINES

Lucien Dion, Ste. Therese de Blainville, Quebec, Canada, assignor to Dion Freres Inc., Ste. Therese de Blainville, Quebec, Canada Application December 1, 1954, Serial No. 472,482

2 Claims. (Cl. 198—103)

The present invention pertains to a novel feeding device for agricultural machines.

In the machine under consideration, material is fed to a platform and is discharged by a conveyor that is considerably narrower than the platform. The material must be moved laterally on the platform to the narrower conveyor and the invention resides in an improved mechanism for this purpose.

The invention comprises a rotating wheel for this lateral movement. The principal object of the invention is to introduce a push on the material in addition to the revolution of the feeding member.

In the accomplishment of this object, a disk is rotated and carries feeding elements which are thereby revolved. These elements are at the same time rotated on their respective axes by connection to a fixed cam track eccentric of the disk. The combined rotation and revolution of the feeding elements results in a longer push on the material than can be derived from revolution alone.

The invention further provides multiple feeding elements spaced radially and laterally of the carrying disk, for adequate engagement with the material being handled.

The invention is fully disclosed by way of example in the following description and in the accompanying drawings in which:

Figure 1 is a detail side elevation;

Figures 2 and 3 are detail cross sections in different positions of the device;

Figure 4 is another detail elevation;

Figure 5 is a detail front elevation; and

Figure 6 is a plan view.

Reference to these views will now be made by use of like characters which are employed to designate corresponding parts throughout.

The agricultural machine comprises a frame structure 1 which supports a belt or conveyor 2 for delivering material to a platform 3 and thence to a narrow discharge conveyor 4. The platform slopes upward from both edges to the center line as shown in Figure 5. A wheel 5 is journalled at the center line for passing the material to the conveyor 4, after the material has been delivered to the wheel by the means that will now be described. The wheel is driven by suitable mechanism indicated by the numeral 6.

Over each side of the platform 3 is mounted a bar 7 comprised in the frame structure and extending from a side of the frame to a point between the wheel 5 and the conveyor 4. Since the assemblies on both bars are identical, only one will be described.

To each bar is secured a plate 8 in which is journalled a shaft 9. The shaft carries a drive wheel 10 positioned on the outer side of the bar and suitably driven by a belt 11 or the like. The inner end of the shaft carries a disk 12.

On the plate 8 is formed a circular cam track 13 eccentric of the shaft 9 and facing the disk 12. The latter is provided with opposed bosses 14 in each of which is journalled a rod 15. A lever 16 extends rigidly from each such rod and carries at its remote end a roller 17 riding in the cam track 13 as shown in Figure 3.

On each rod is mounted a coil spring 18 with fingers 19 extending from each end in the same direction. The center of each coil bears against a pin 20 held in the corresponding rod 15 to hold the spring in one direction of rotation.

In the operation of the device, the rods are revolved around the shaft 9, and the fingers 19 are thereby swept successively over the platform 3 as shown in Figure 5. The eccentric cam track 13 also rotates the rods 15 on their axes to give the fingers 19 a pushing movement in addition to the aforementioned sweep. By the same rotation the fingers are lifted before striking the wheel 5. A maximum push stroke is thereby obtained, or at least a stroke greater than can be obtained by simple revolution. As the fingers are lifted, they merely hang from the rods 15 until the next push stroke.

Although a specific embodiment of the invention has been illustrated and described, it will be understood that various alterations in the details of construction may be made without departing from the scope of the invention as indicated by the appended claims.

What I claim is:

1. In an agricultural machine, a platform, means for delivering material thereto, a discharge conveyor narrower than said platform, a plate supported over said platform, a shaft journalled in said plate and angular to said conveyor, means for rotating said shaft, a disk on said shaft, a pair of spaced rods journalled in said disk, a coil loose on said rod, a pin on said rod and engaged by said coil, fingers extended from the ends of said coil, a lever fixed to said rod, a cam track on said plate and eccentric of said shaft, and a roller on said lever and riding in said track.

2. In an agricultural machine, a platform, means for delivering material thereto, a discharge conveyor narrower than said platform, a plate supported over said platform, a shaft journalled in said plate and angular to said conveyor, means for rotating said shaft, a disk on said shaft, a pair of spaced rods journalled in said disk, a coil loose on each rod, a pin on each rod and engaged by the corresponding coil, fingers extended from both ends of said coils, a lever fixed to each rod, a cam track on said plate and eccentric of said shaft, and a roller on each lever and riding in said cam track.

References Cited in the file of this patent

UNITED STATES PATENTS

| 1,409,695 | French | Mar. 14, 1922 |
| 2,488,738 | Pool | Nov. 22, 1949 |
| 2,497,409 | Jones | Feb. 14, 1950 |
| 2,608,283 | Oehler | Aug. 26, 1952 |
| 2,643,759 | Swanson | June 30, 1953 |